United States Patent [19]

Herman

[11] Patent Number: 4,653,328

[45] Date of Patent: Mar. 31, 1987

[54] METHOD AND APPARATUS FOR ECHO-ULTRASOUND IMAGING USING COMPOUND AM-FM DETECTION WITH INCREASED DYNAMIC RANGE

[75] Inventor: Stephen Herman, Monsey, N.Y.

[73] Assignee: North American Philips Corporation, New York, N.Y.

[21] Appl. No.: 726,748

[22] Filed: Apr. 24, 1985

[51] Int. Cl.⁴ .............................................. G01N 29/04
[52] U.S. Cl. ....................................... 73/602; 73/620; 73/629; 128/660
[58] Field of Search ........................... 73/602, 620, 629; 128/660

[56] References Cited

U.S. PATENT DOCUMENTS

| | | | |
|---|---|---|---|
| 3,453,871 | 7/1969 | Krautkramer | 73/602 |
| 4,086,818 | 5/1978 | Reynolds | 73/620 |
| 4,512,196 | 4/1985 | Barnes | 73/620 |
| 4,534,359 | 8/1985 | Miller-Jones et al. | 128/660 |
| 4,543,826 | 10/1985 | Ferrari | 73/602 |

*Primary Examiner*—Anthony V. Ciarlante
*Attorney, Agent, or Firm*—Jack E. Haken

[57] ABSTRACT

A Compound echo-ultrasound imaging system in which the intensity of pixels in an image is a nonlinear function of the amplitude and frequency of echo signals. The dynamic range of a synchronous FM detector in the system is increased by effectively filtering from the echo signals all instantaneous frequencies which would produce intensity levels greater than a corresponding signal of equal amplitude at the carrier frequency of the ultrasound pulses. Filtering may be effectively accomplished by setting the Corner Frequency of the synchronous detector to the carrier frequency of the transmitted pulses.

4 Claims, 9 Drawing Figures

SIGNAL AMPLITUDE/SQUELCH AMPLITUDE

SIGNAL AMPLITUDE/SQUELCH AMPLITUDE

METHOD AND APPARATUS FOR ECHO-ULTRASOUND IMAGING USING COMPOUND AM-FM DETECTION WITH INCREASED DYNAMIC RANGE

The invention relates to apparatus which utilizes ultrasound pulse-echo techniques to image the internal structures of a body. More specifically, the invention relates to apparatus and methods which increase the dynamic range of an imaging system in which the brightness of pixels is modulated by a nonlinear function of both the amplitude and the frequency deviation of echo signals.

BACKGROUND OF THE INVENTION

Ultrasound pulse-echo imaging has become an important modality for medical diagnosis. Pulses of ultrasound energy are produced in a transducer and directed into a body. The energy is scattered from organ boundaries and other impedance discontinuities within the body; generating echoes which are detected with a transducer (which may be the same transducer used for transmission) to produce electrical signals which are then processed to form an image of the internal body structures. Most ultrasound pulse echo imaging systems of the prior art generate images from information which is extracted from the AM envelope of the echo signals. Such systems usually make use of a peak detector to extract a video signal from the echoes and generate a display by modulating the intensity of each pixel as a function of the amplitude of a corresponding portion of the video signal. Regions of the body which return strong (i.e.: high amplitude) echoes, for example organ boundaries, will thus be depicted as bright areas in the image whereas regions which return low amplitude echoes, for example homogeneous regions within the liver, will be depicted as darker areas in the image. This apparatus is more completely described, for example, in *Medical Ultrasound Imaging: An Overview Of Principles And Instrumentation*, J. F. Havlice and J. C. Taenzer; Proceedings of the IEEE, Vol. 67, No. 4, April 1979; pages 620–640, which is incorporated herein, by reference, as background material.

In B-scan imaging, an ultrasound transducer is translated and/or angulated along the surface of a body undergoing examination. A two-dimensional image is generated by plotting the detected characteristic of echoes at an image point which corresponds to the coordinates of the scatterer which produce the echoes. The depth coordinate of the scatterer is determined by measuring the time delay between pulse transmission and the receipt of the corresponding echo signal. The lateral coordinate of the scatterer is determined by measuring the lateral position and/or angulation of the transducer.

More recently, Dr. Leonard Ferrari has described a technique for producing images utilizing information which is contained in the FM envelope of an ultrasound pulse-echo signal (Dr. Ferrari's U.S. Pat. No. 4,543,826 is incorporated herein by reference as background material.) This technique maps the instantaneous phase or frequency of an echo signal into intensity levels in an image. For example, regions of the body which return echoes with higher instantaneous frequencies may be displayed as bright areas while regions of the body which return echoes with lower frequencies may be displayed as darker areas. A squelch circuit may further be provided which turns-off the FM detector and displays a neutral intensity level in the event that the amplitude of the echo signal is too low for FM detection.

Dr. Ferrari's patent application describes a system in which the intensity of regions in an image is normally independent of the amplitude of the echo signal. More recently, imaging systems have been developed wherein the intensity of pixels is modulated as a nonlinear function of both the amplitude and the frequency deviation of the echo signal (such systems are hereafter referred to as "Compound Systems").

Compound Systems appear to have the ability to delineate diseased regions within certain organs (for example, the liver) which were not heretofore discernable in systems which used either pure AM or pure FM detection. However, prior art Compound Systems suffered from low dynamic video range and, in some cases, when they were adjusted to display diseased areas within a particular organ (for example, the liver) they could not, without readjustment, clearly image other structures or organs.

SUMMARY OF THE INVENTION

The present invention provides methods and apparatus for use with Compound Systems which increase the dynamic video range and thus allow delineation of diseased regions within a particular organ while at the same time displaying other structures and organs.

The object of the invention is achieved by effectively filtering from echo signals those instantaneous frequency components which lie above the compound AM-FM detection curve. In the case of a synchronous FM detector circuit with squelch, this filtering may be effectively achieved by shifting the Corner Frequency of the detector to the nominal carrier frequency of the transmitted ultrasound pulses.

DESCRIPTION OF THE DRAWINGS

The specification and claims are to be read in connection with the accompanying drawings in which:

DESCRIPTION OF THE PREFERRED EMBODIMENTS

Figure 1:
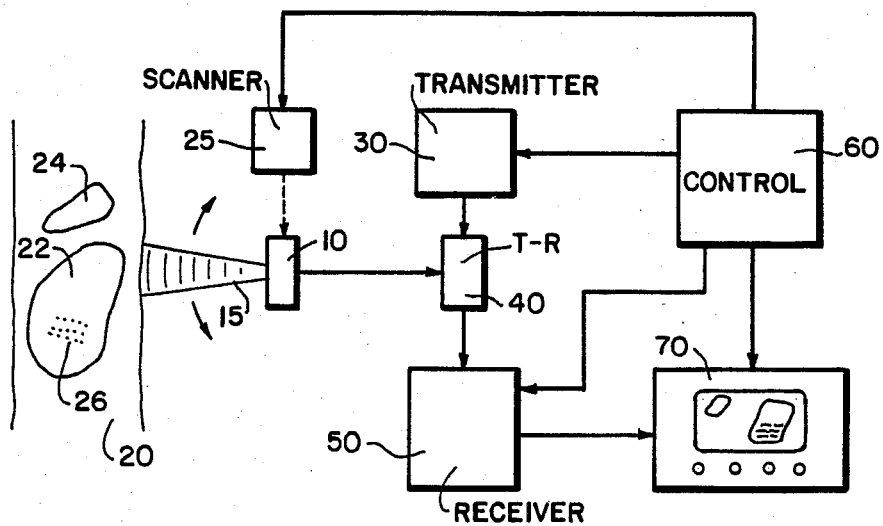
FIG. 1 schematically illustrates a pulse-echo ultrasound system.

FIG. 1 illustrates an echo-ultrasound imaging system of the present invention. A transmitter 30 produces a stream of periodic radio frequency (RF) electrical pulses having a carrier frequency $f_o$ which energize a transducer 10 via a T-R switch 40. The transducer 10 converts the electrical pulses into a beam of ultrasound energy 15 which is projected from the transducer into a body 20. The ultrasound energy is scattered within the body, for example, from the boundaries of organs 22 and 24, and portions of the energy are returned, in the form of echoes, to the transducer 10 where they are converted into electrical signals and transmitted, via the T-R switch 40 to a receiver 50. The receiver detects the echo signals producing a video output signal having an amplitude which is a nonlinear function of both the instantaneous amplitude of the echo signals and the instantaneous frequency of the echo signals. The output of the receiver modulates the intensity of pixels in a display 70, typically a CRT display.

The beam of ultrasound pulses is displaced and/or angulated with respect to the body 20 by a scanner 15 which is mechanically and/or electrically coupled to the transducer 10. In a typical sector-scan system, the scanner may be mechanically coupled to the transducer to sweep the ultrasound beam through an arc with respect to the body and its organs. The methods and apparatus of the present invention are, however, equally applicable to linear or phased array systems or to pantograph type B-scan systems. Signals from the scanner 15 are transmitted to the display 70 via a control circuit 60 which is likewise coupled to the transmitter and receiver and which controls the sweep circuitry of the display 70 so that the video signals from the receiver 50 modulate the intensity of display pixels at positions in the image which correspond to locations in the body of the structures which produced the corresponding echo.

In the prior art, it was found that Compound Systems of the type described, when properly calibrated for a liver 22, were particularly useful for discerning diseased areas 26 therein, but that, because of the limited dynamic range of the detection system, when so calibrated, the system might not be suitable for producing a visible image of another organ (for example, 24) in the image.

Figure 2:
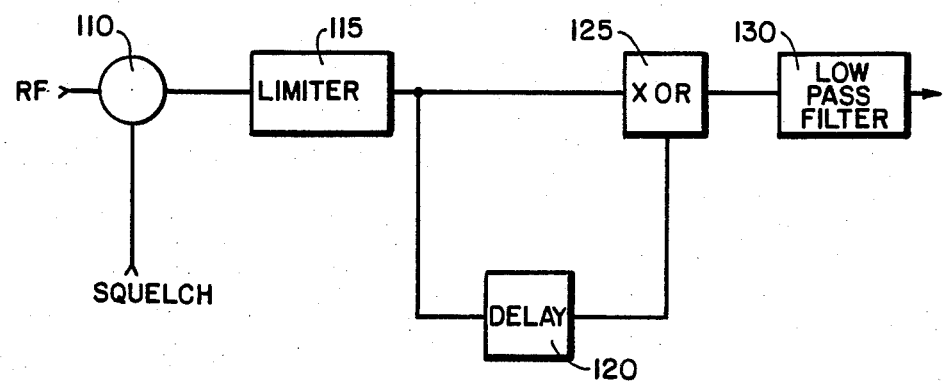
FIG. 2 illustrates a digital implementation of a synchronous detector.

FIG. 2 is a typical synchronous FM detector stage which is suitable for use in the receiver of a Compound System. Echo signals RF from the transducer and T-R switch are mixed with a SQUELCH signal in an adder 110. The SQUELCH signal is typically a radio frequency sine wave at the nominal carrier frequency $f_o$ of the pulses which are transmitted into the body. The output of the adder 110 is applied to a hard limiter 115. The output of the hard limiter 115 is applied directly to one input of an EXCLUSIVE OR gate 125. The output of the limiter 115 is also applied, via a delay circuit 120 (having a delay time D) to the second input of the EXCLUSIVE OR gate 125. The output of the EXCLUSIVE OR gate 125 is transmitted to the input of the display via a low-pass filter 130. The low-pass filter is designed to remove radio frequency components from the output of the EXCLUSIVE OR gate and to allow only video signals to pass to the display.

Figure 3:
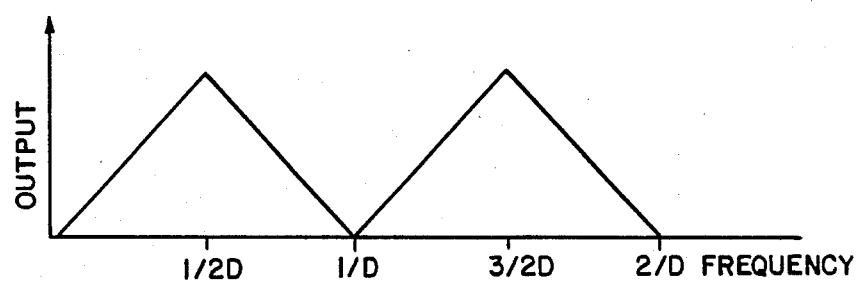
FIG. 3 is the response curve of the detector of FIG. 2.

The circuit of FIG. 2 operates as a frequency deviation detector whenever the amplitude of the signal at the input RF is substantially greater than the amplitude of the SQUELCH signal. FIG. 3 is a plot of the output of the low-pass filter 130 under these conditions as a function of the frequency of the input RF. It may be seen that the output of the low-pass filter rises with increasing input frequency until the input frequency is $\frac{1}{2}D$. The output of the low pass filter then drops linearly as the frequency rises from $\frac{1}{2}D$ to $1/D$ and alternates thereafter in sawtooth fashion. Hereinafter, and in the claims that follow, the frequency $\frac{1}{2}D$ is termed the "Corner Frequency" of this detector.

In FM echo-ultrasound systems and in Compound Systems of the prior art, the value of the delay circuit D was usually chosen to be $\frac{1}{2}f_o$ where $f_o$ is the nominal carrier frequency of the transmitted ultrasound pulses. Echoes which were returned without any frequency shift thus produced display shades of neutral gray while echoes which contained positive or negative frequency shifts produced lighter and darker shades in the display.

Figure 4:
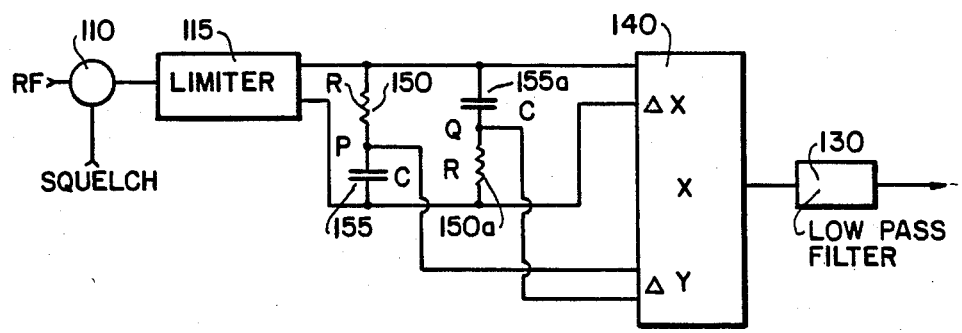
FIG. 4 is an analog implementation of a synchronous detector.

FIG. 4 is an analog implementation of a synchronous FM detector stage for use in Compound Systems. The echo signal RF and SQUELCH are combined in an adder 110 in the same manner as described with respect to FIG. 2. The output of the adder 110 is applied to a hard limiter 115 which produces a balanced output. The balanced output is applied to one input x of an analog multiplier 140. The output of the hard limiter 115 is further applied to a RC delay network comprising resistors 150 and 150a and capacitors 155 and 155a to derive a shifted signal between nodes P and Q which is applied to the y input of the analog multiplier 140. The output of the analog multiplier 140 is applied to a low-pass filter 130 in the same manner as in FIG. 2 and the output of the low-pass filter is applied to the input of the display.

Figure 5:
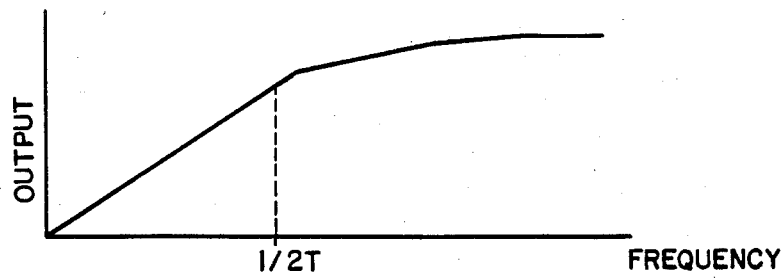
FIG. 5 is the response curve of the detector of FIG. 4.

The circuit of FIG. 4 functions as a frequency deviation detector whenever the amplitude of the signal at the input RF is substantially greater than the amplitude of the SQUELCH signal. FIG. 5 illustrates the transfer function of this circuit under these conditions and is a plot of the amplitude of the output of the low-pass filter as a function of the instantaneous frequency of the input RF. It may be seen that the amplitude of the output rises monotonically with increasing input frequency up to a frequency of approximately $\frac{1}{4}T$ where $T=RC$ is the time constant of the RC delay network. At input frequencies above approximately $\frac{1}{4}T$, the output of the detector saturates and has a substantially constant value. In the circuit of FIG. 4, $\frac{1}{4}T$ is the Corner Frequency which corresponds to the Corner Frequency $\frac{1}{2}D$ in the circuit in FIG. 2.

When circuits of the type illustrated in FIG. 4 were used in FM systems or Compound Systems of the prior art, the RC time constant of the delay network was usually chosen to be equal to $\frac{1}{2}f_o$, so that echoes which were returned without any frequency shift produced neutral gray tones in the display.

The output signal from the circuits of FIG. 2 and FIG. 4 is a nonlinear function of both the instantaneous amplitude and instantaneous frequency of the input signal RF when the instantaneous amplitude of the signal RF is close to the amplitude of the SQUELCH signal.

Figure 6:
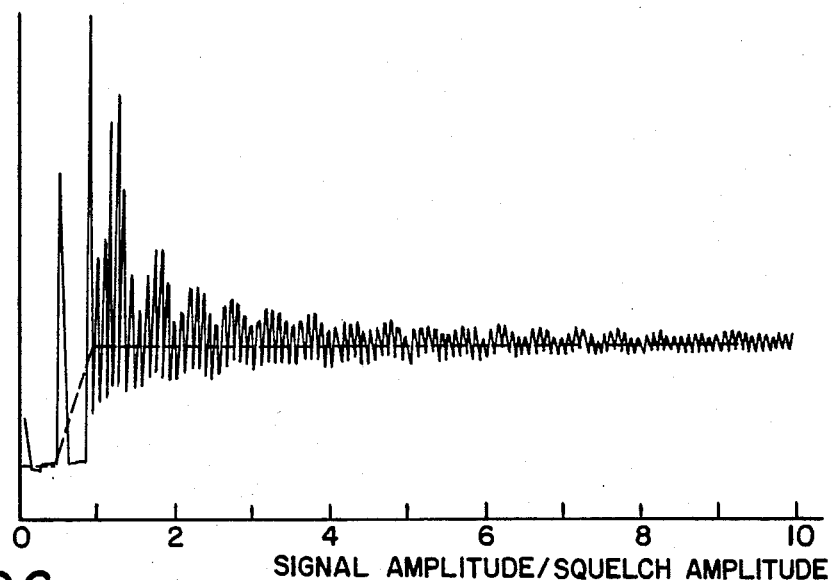
FIG. 6 illustrates the AM-FM transfer function of a prior art Compound System.

FIG. 6 illustrates the nonlinear response of the output of the circuit of FIG. 4 in response to variations of the input signal amplitude. The instantaneous frequency of a complex waveform may be calculated from the length of time between successive zero crossings. FIG. 6 shows the instantaneous frequencies of the sum of a low-frequency SQUELCH of fixed amplitude and a higher-frequency RF signal of fixed frequency and whose amplitude is linearly increasing in time. The output of the systems of FIG. 4 or FIG. 2 are equal to the waveform of FIG. 6 averaged by a low-pass filter. This averaged output is shown by the dotted curve of FIG. 6.

The plot illustrates the operation of prior art synchronous detectors in Compound Systems where the nominal RF frequency of the ultrasound pulses was set at one half of the Corner Frequency of the detector.

As can be seen from the plot, the circuit is essentially insensitive to input variations when the instantaneous signal amplitude is less than approximately one-half the SQUELCH amplitude. The output only changes over a narrow range of instantaneous input amplitudes, from approximately one half the SQUELCH amplitude to the point where the signal amplitude is approximately equal to the SQUELCH amplitude (as depicted by the dashed line). For signal amplitudes which are higher than the SQUELCH amplitude, the average output amplitude remains constant even thought the instantaneous frequencies cause wide variations.

In accordance with the present invention, the dynamic range of the synchronous detector in a Compound System can be greatly increased by effectively filtering the signal to eliminate all instantaneous frequency variations which produce output signal excursions above the dashed average output line in FIG. 6. In a Compound System, this is equivalent to eliminating all frequency components which would produce a pixel brightness greater than a corresponding signal of equal amplitude at $f_o$.

Figure 7:
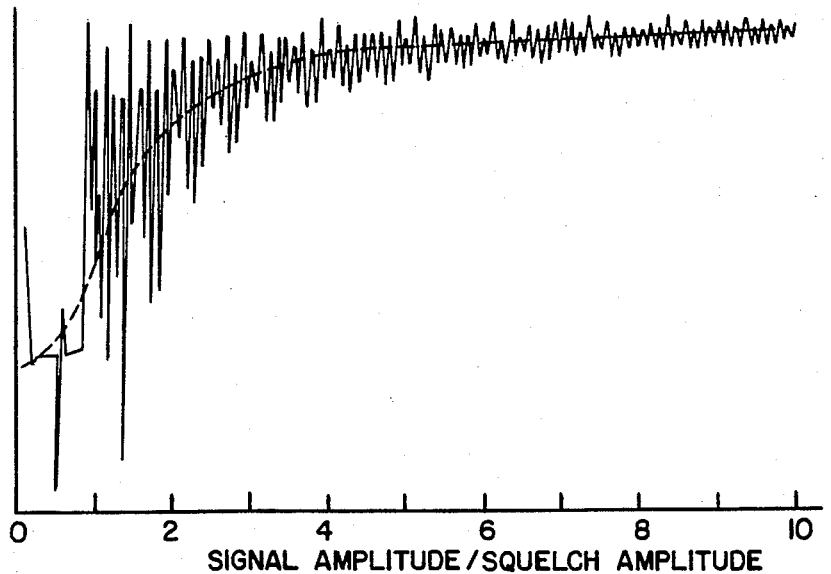
FIG. 7 illustrates the AM-FM transfer function of a Compound System of the present invention.

FIG. 7 illustrates the operation of the detector of FIG. 4 in which the RC network time constants have been adjusted to effectively eliminate detection of all frequency components which produce outputs which lie above the dashed line in FIG. 6. Except for the network time constant values, FIG. 7 corresponds to FIG. 6. It may be seen that the amplitude-sensitive dynamic range of the circuit has been extended far beyond the earlier saturation amplitude point (at which the signal amplitude equaled the SQUELCH amplitude) and that the circuit now saturates in the range where the signal amplitude is between three and four times the SQUELCH amplitude.

Filtering to effectively eliminate all frequencies which produce responses above the average amplitude output line of FIG. 6 may be accomplished by choosing appropriate values for the delay time D for the circuit of FIG. 2 or the network RC time constant T of FIG. 4. Maximum dynamic range improvement is obtained when the Corner Frequency of either detector is set equal to the nominal carrier frequency $f_0$ of the transmitted RF pulses. That is when $D=\frac{1}{2}F_0$ or $T=\frac{1}{2}f_0$. When the delay or RC time constant is much smaller than these values, the dynamic range approaches a minimum. Delays in the intermediate range produce intermediate levels of dynamic range.

Figure 8:
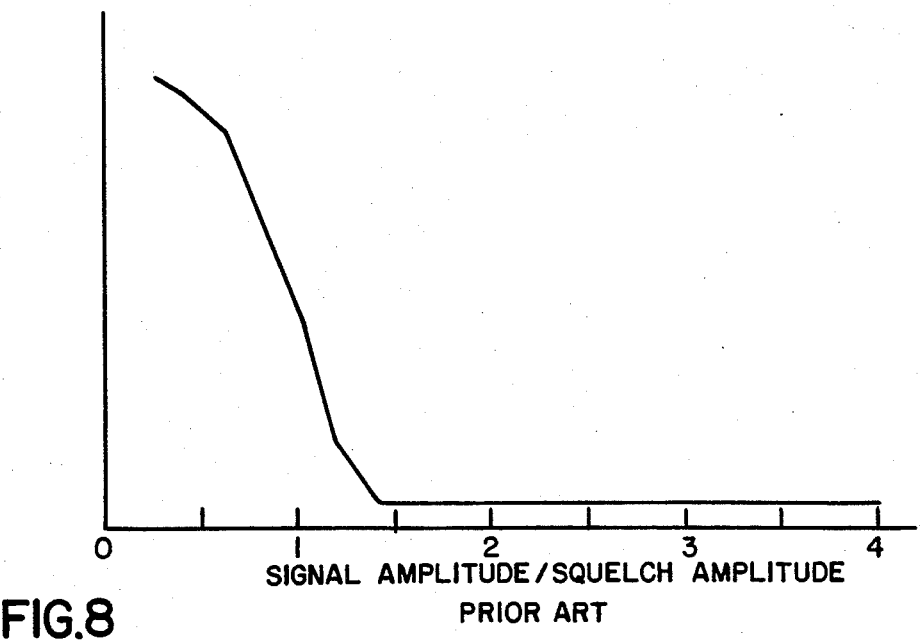
FIG. 8 is a plot of the dynamic range of a prior art Compound System.
Figure 9:
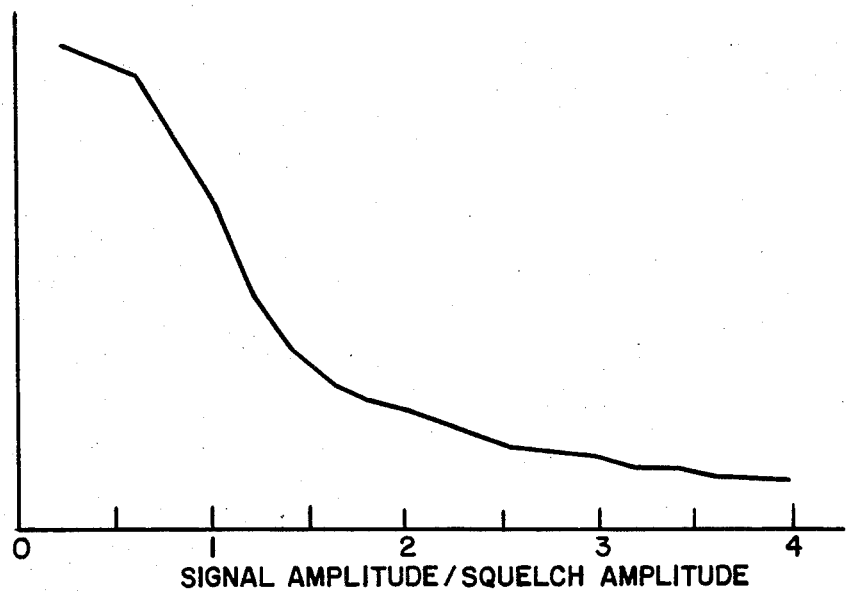
FIG. 9 is a plot of the dynamic range of a Compound System of the present invention.

FIG. 8 shows the inverted output of a simulated prior art synchronous detector of FIG. 2 with the delay time D set to 50 nanoseconds (Corner Frequency = 10 MHz) and the pulse carrier frequency $f_o=4$ MHz. The limited dynamic range is evidenced by the fact that the curve saturates near a signal to SQUELCH ratio of 1.0. FIG. 9 shows the same simulated curve with the delay D=100 nanoseconds (corner frequency = 5 MHz). It can be seen that the Compound System signal has a wide dynamic range and does not saturate until the signal to SQUELCH amplitude ratio is between 3 and 4.

I claim:

1. Apparatus for ultrasound pulse-echo imaging comprising:
   means for directing pulses of ultrasound energy having a nominal carrier frequency $f_0$ into an object and for producing an electrical echo signal which represents echoes of said pulses which are reflected from structures within the object;
   means for adding a squelch signal, at the nominal carrier frequency $f_0$, to the echo signal;
   synchronous FM detector means connected to demodulate the sum of the squelch signal and the echo signal into a video signal whose amplitude is a nonlinear function of the instantaneous amplitude and the instantaneous frequency deviation of the echo signal, said detector means having a transfer function with a Corner Frequency;
   display means which produce an image of the object by displaying pixels which have intensity values which correspond to the amplitude of the video signal at picture coordinates which correspond to locations in the object from which the corresponding echoes were reflected;
   wherein, as an improvement:
   the Corner Frequency of the transfer function of the synchronous detector means is approximately equal to the nominal carrier frequency $f_0$.

2. The apparatus of claim 1 wherein the synchronous detector means comprise:
   a hard limiter having an input connected to receive the sum of the echo signal and the squelch signal;
   an EXCLUSIVE OR gate having a first input connected to the output of the hard limiter;
   delay means for producing a delay of approximately $\frac{1}{2}f_0$ having an input connected to the output of the hard limiter and an output connected to the second input of the EXCLUSIVE OR gate; and
   a low-pass filter having an input connected to the output of the EXCLUSIVE OR gate which attenuates signals at the carrier frequency and passes signals at video frequencies.

3. The apparatus of claim 1 wherein the synchronous detector means comprise a hard limiter having an input connected to receive the sum of the echo signal and the squelch signal;
   analog multiplier means having a first input connected to the output of the hard limiter;
   a RC delay network having a time constant T, an input connected to the output of the hard limiter, and and an output connected to the second input of the analog multiplier means; and
   a low-pass filter having an input connected to the output of the analog multiplier which attenuates signals at the carrier frequency and passes signals at video frequencies;
   wherein the time constant of the RC delay network T is approximately equal to $\frac{1}{2}f_0$.

4. In a method for displaying an echo-ultrasound image of an object which comprises directing ultrasound pulses having a nominal carrier frequency to said object to produce reflected pulse signals, utilizing values of the instantaneous amplitude and the instantaneous frequency of the reflected pulse signals from said object as input values for a nonlinear calculation to generate an output value for each pixel in said image wherein said output value is a nonlinear function of said instantaneous amplitude and said instantaneous frequency for one or more of said reflected ultrasound pulse signals and then controlling the brightness of corresponding pixels in said image in response to said output values, the improvement comprising:
   effectively filtering the values of each of said reflected pulse signals before utilizing their values as the inputs for said calculation by removing from said signals all instantaneous frequency values which would produce output values greater than the output value which would be produced by a signal having the same instantaneous amplitude value as the filtered signal and an instantaneous frequency at the nominal carrier frequency of the ultrasound pulses.

* * * * *

UNITED STATES PATENT AND TRADEMARK OFFICE
CERTIFICATE OF CORRECTION

PATENT NO. : 4,653,328

DATED : March 31, 1987

INVENTOR(S) : STEPHEN HERMAN

It is certified that error appears in the above-identified patent and that said Letters Patent is hereby corrected as shown below:

In the Specification:

Column 3, lines 64, 65 and 67, "$\frac{1}{2}D$" should be $--\frac{1}{2D}--$

Column 4, line 3 and 44, "$\frac{1}{4}f_o$" should be $--\frac{1}{4f_o}--$.

Column 4, lines 34, 36, and 38, "$\frac{1}{2}T$" should be $--\frac{1}{2T}--$

Column 4, line 39, "$\frac{1}{2}D$" should be $--\frac{1}{2D}--$

Column 5, line 44, "$\frac{1}{2}F_o$" and "$\frac{1}{2}f_o$" should be $--\frac{1}{2f_o}--$ In the Claims:

Claim 2, line 8 and Claim 3 line 16, "$\frac{1}{2}f_o$" should be $--\frac{1}{2f_0}--$.

Signed and Sealed this

First Day of December, 1987

Attest:

DONALD J. QUIGG

Attesting Officer    Commissioner of Patents and Trademarks